US006178966B1

(12) United States Patent
Breshears (10) Patent No.: US 6,178,966 B1
(45) Date of Patent: Jan. 30, 2001

(54) HEAT AND MOISTURE EXCHANGE APPARATUS FOR ARCHITECTURAL APPLICATIONS

(76) Inventor: John E. Breshears, 146 Orchard St., Watertown, MA (US) 02172

( * ) Notice: Under 35 U.S.C. 154(b), the term of this patent shall be extended for 0 days.

(21) Appl. No.: 09/290,287

(22) Filed: Apr. 13, 1999

Related U.S. Application Data (60) Provisional application No. 60/082,240, filed on Apr. 16, 1998.

(51) Int. Cl.⁷ .......................................................... F24J 2/00
(52) U.S. Cl. .......................... 126/702; 126/650; 126/629; 165/59; 165/54; 96/118
(58) Field of Search ................................... 126/702, 701, 126/629, 572, 633, 573, 648, 574, 649, 650, 652; 52/201, 172; 454/200; 165/4, 59, 11.1, 48.1, 48.2, 54; 96/118, 4; 250/203.4

(56) References Cited

U.S. PATENT DOCUMENTS

| 246,626 | * | 9/1881 | Morse ................................... | 126/629 |
| 549,765 | * | 11/1895 | Calver .................................. | 126/681 |
| 2,288,465 | * | 6/1942 | Knudsen ............................... | 126/633 |
| 2,595,905 | * | 5/1952 | Telkes .................................. | 126/633 |
| 3,666,007 | * | 5/1972 | Yoshino et al. ...................... | 165/166 |
| 3,785,931 | * | 1/1974 | Coffey et al. ........................ | 202/234 |
| 3,860,055 | * | 1/1975 | Wild ..................................... | 126/702 |
| 3,923,461 | * | 12/1975 | Barden ...................................... | 96/4 |
| 3,925,212 | * | 12/1975 | Tchernev .............................. | 422/186 |
| 3,925,945 | * | 12/1975 | White ................................... | 126/629 |
| 3,926,561 | * | 12/1975 | Lucero ................................. | 436/178 |
| 3,955,555 | | 5/1976 | Bostrom . | |
| 3,977,466 | * | 8/1976 | Johansson ............................. | 165/59 |
| 4,019,868 | * | 4/1977 | Sebacher et al. ......................... | 96/4 |
| 4,040,804 | * | 8/1977 | Harrison .............................. | 165/165 |
| 4,050,443 | * | 9/1977 | Peck et al. ........................... | 126/629 |
| 4,068,652 | * | 1/1978 | Worthington ........................ | 126/603 |
| 4,159,707 | * | 7/1979 | Miquel ................................. | 126/702 |
| 4,183,398 | * | 1/1980 | Ehrke ................................... | 126/629 |
| 4,232,731 | * | 11/1980 | Kaplow et al. ...................... | 126/629 |
| 4,269,171 | | 5/1981 | McArthur . | |
| 4,270,516 | * | 6/1981 | Hopper et al. ....................... | 126/675 |

(List continued on next page.)

FOREIGN PATENT DOCUMENTS

| 0661502 | | 7/1995 | (EP) . | |
| 56-30555 | * | 3/1981 | (JP) .................................... | 126/629 |
| 59-001989 | | 7/1984 | (JP) . | |
| 09318099 | | 12/1997 | (JP) . | |

* cited by examiner

*Primary Examiner*—Ira S. Lazarus
*Assistant Examiner*—David Lee
(74) *Attorney, Agent, or Firm*—Kudirka & Jobse, LLP

(57) ABSTRACT

An apparatus for enhanced heat and moisture exchange between make-up and exhaust air streams includes a housing having an exterior wall defining an interior channel through which air streams may pass and a water vapor permeable barrier disposed within the interior channel so as to partition the interior channel into a plurality of subchannels. At least a portion of exterior wall of the housing comprises a light-transmitting material. The exchange apparatus may be implemented as a modular panel which can be integrated into the exterior walls or facade of a structure. Also disclosed is a preheating apparatus in fluid communication with one of the subchannels of the exchanger apparatus. The preheating apparatus also includes an exterior wall defining an interior channel and having at least a portion of the wall formed of a light transmitting material. One or more energy absorbing heating elements are disposed within the interior channel of the preheating apparatus. Also disclosed is a method for enhancing heat and moisture exchange between a first gas stream and a second gas stream including the steps of separating the gas streams with a water vapor permeable barrier, controlling the pressure of the gas streams to enable heat and moisture exchange through the barrier, and exposing at least one of the gas streams to a source of radiant energy.

20 Claims, 6 Drawing Sheets

U.S. PATENT DOCUMENTS

| | | | |
|---|---|---|---|
| 4,301,787 | * 11/1981 | Rice | 126/629 |
| 4,331,066 | * 5/1982 | Schmidlin | 126/629 |
| 4,338,996 | * 7/1982 | Frank | 165/57 |
| 4,369,765 | * 1/1983 | McDaniel | 126/572 |
| 4,382,436 | * 5/1983 | Hager | 126/630 |
| 4,412,528 | * 11/1983 | Elzinga, Jr. | 126/629 |
| 4,418,378 | * 11/1983 | Johnson | 362/97 |
| 4,436,084 | * 3/1984 | Carlston et al. | 126/628 |
| 4,462,459 | 7/1984 | Schmidlin . | |
| 4,469,087 | * 9/1984 | Cameron | 126/629 |
| 4,478,210 | * 10/1984 | Sieradski | 126/570 |
| 4,577,619 | * 3/1986 | Howe, Jr. | 126/629 |
| 4,582,129 | * 4/1986 | Yano et al. | 165/54 |
| 4,609,039 | * 9/1986 | Fushiki et al. | 165/145 |
| 4,658,806 | * 4/1987 | Boozer | 126/703 |
| 4,867,134 | * 9/1989 | O'Brien | 126/675 |
| 4,932,982 | * 6/1990 | Hayes | 96/4 |
| 4,950,314 | * 8/1990 | Yamada et al. | 96/4 |
| 5,182,921 | 2/1993 | Yan . | |
| 5,551,991 | * 9/1996 | Avero | 126/704 |
| 5,681,368 | 10/1997 | Rahimzadeh . | |
| 5,733,435 | * 3/1998 | Prasad et al. | 96/4 |
| 5,976,220 | * 11/1999 | Braun et al. | 96/4 |

HEAT AND MOISTURE EXCHANGE APPARATUS FOR ARCHITECTURAL APPLICATIONS

RELATED APPLICATIONS

This application claims priority to U.S. Provisional Application Ser. No. 60/082,240, filed Apr. 16, 1998 by John E. Breshears, entitled "A DEVICE FOR HEAT AND MOISTURE EXCHANGE IN BUILDING VENTILATION SYSTEMS AND INCORORPORATED INTO THE BUILDING OF CLOSURE SYSTEM AND EMPLOYING SOLAR ENERGY TO ENHANCE ITS PERFORMANCE," the subject matter of which is incorporated herein by reference.

FIELD OF THE INVENTION

This invention relates to air conditioning apparatus, and, more specifically, to a heat and moisture apparatus for enhancing the exchange of heat and moisture between air streams.

BACKGROUND OF THE INVENTION

Centrally heated or cooled buildings require that some portion of fresh "makeup" air be added continuously to the total volume of circulated air to keep the space fresh, comfortable and healthy. Hence, a corresponding portion of the air which has already been heated or cooled must be exhausted, resulting in a loss of heat energy and a corresponding reduction in the heating or cooling efficiency of the system conditioning the air in the spaces. Heat exchangers are commonly used in the exhaust air and makeup airflow paths of these systems to recover some of the energy from the exhaust air and to induce warmer make-up air during heating processes and cooler makeup air during cooling processes.

So-called "total heat exchangers," which perform moisture exchange as well as heat exchange, serve to introduce warmer makeup air having a higher moisture content during heating process and cooler air having a lower moisture content during cooling process.

Materials used for heat exchangers commonly include metal foils and sheets, plastic films, paper sheets, and the like. Good heat exchange is generally possible with these materials, but moisture exchange cannot easily be performed. Dessicants, or moisture adsorbing materials, are occasionally employed to transfer moisture. With this method, the dessicant merely holds the moisture. To effect transfer moisture between gas streams, the dessicant must be relocated from the gas stream of higher moisture content to the gas stream of lower moisture content, requiring an additional input of mechanical energy. With many dessicant materials, satisfactory performance can be achieved only with the input of additional thermal energy to induce the dessicant to desorb the accumulated moisture.

Heat and moisture exchange are both possible with an exchange-film made of paper. However, water absorbed by the paper from condensation, rain, or moisture present in the air can lead to corrosion, deformation, and mildew growth, and, hence, deterioration of the paper exchange film.

The various types of heat and moisture exchangers in common usage are generally contained within an opaque metal housing and located at or near the building air-handling units in the mechanical room, basement, or rooftop of the building. The nature of moisture exchange requires a very large surface area in contact with the gas stream, and, consequently, total heat exchangers are often very large in size when compared to heat-only exchangers. A larger exchanger in the conventional location requires additional mechanical room space and/or additional load-bearing capacity of the roof in the case of a roof-top unit.

Porous polymeric or ceramic films are capable of transferring both heat and moisture when interposed between air streams of differing energy and moisture states. A system for heat and moisture exchange employing a porous membrane is described in Japanese Laid-Open Patent Application No. 54-145048. A study of heat and moisture transfer through a porous membrane is given in Asaeda, M., L. D. Du, and K. Ikeda. "Experimental Studies of Dehumidification of Air by an Improved Ceramic Membrane," Journal of Chemical Engineering of Japan, 1986, Vol. 19, No. 3. A disadvantage of such porous composite film is that it also permits the exchange of substantial amounts of air between the gas streams, as well as particles, cigarette smoke, cooking odors, harmful fumes, and the like. From the point of view of building indoor air quality, this is undesirable. In order to prevent this contamination of make-up air, the pore volume of a porous film is preferably no more than about 15%, which is difficult and expensive to achieve uniformly. Furthermore, a porous film made to a thickness of 5 to 40 micrometers in order to improve heat exchange efficiency tears easily and is difficult to handle.

Accordingly, a need exists for an efficient heat and moisture exchange apparatus which will not contaminate make-up air.

Additionally, a need exists for heat- and moisture-exchange for use in a system for conditioning air which has excellent heat exchange efficiency, high moisture exchange capability, and serves as a barrier to air flow between exhaust and makeup air streams.

SUMMARY OF THE INVENTION

The present invention contemplates an apparatus for enabling heat and moisture exchange between make-up and exhaust air streams in the heating and air conditioning system of a structure. The exchange apparatus of the present invention has a modular, panel-like configuration which may be integrated into the exterior walls of a structure. More specifically, the exchanger apparatus may be implemented as a curtainwall panel comprising a rigid frame for holding a pair of light transmitting panes, the frame and panes collectively defining an interior cavity within the apparatus. A water vapor permeable barrier, attached to the frame, partitions the interior channel into at least first and second subchannels which may be coupled in fluid communication with make-up and exhaust air streams, respectively. The light transmitting properties of the panes allow incident solar radiation to permeate the panels, thereby creating a more natural ambient environment in the interior of the structure adjacent with the panel, as well as raising the temperature of the air stream and the water vapor permeable barrier to further enhance the exchange of moisture through the barrier.

According to a first aspect of the invention, an apparatus for enabling heat and moisture exchange comprises an exchanger housing having an exterior wall defining an interior channel through which a gas stream may pass. A water vapor permeable barrier is disposed within the interior channel and partitions the interior channel into a plurality of subchannels. At least a portion of the exterior wall of the exchanger housing comprises a light transmitting material. The subchannels defined within the apparatus are connectable to make-up an exhaust air streams or sources thereof. In one embodiment, the heat and moisture exchanger is further coupled to a preheating apparatus which may be used to heat one or both air streams prior to passage through the exchanger apparatus. In one embodiment, the preheating apparatus comprises an exterior wall defining a preheat channel through which an air stream may flow and an energy absorbing material disposed within the preheat channel. The energy absorbing material may comprise a metal, or, alternatively, photovoltaic cells or film. In another embodiment, the pressure of the gas streams are controlled so that the makeup and exhaust streams flow through the subchannels of the exchanger apparatus in different directions.

In accordance with another aspect of the invention, the water vapor permeable barrier may comprise a composite film made of porous polymeric membrane having applied thereto a water-vapor-permeable polymeric material so as to form a non-porous barrier to block the flow of air and other gas. The composite film is interposed between a gas stream having a first, higher water content, i.e. the makeup air stream, and a gas stream having a second, lower water content, i.e., the exhaust air stream. Moisture from the gas stream having the higher water content permeates through the composite film to the side adjacent the gas stream having the lower water content where the moisture is taken up by the gas stream having the lower water content. Heat from the higher temperature gas stream is conducted through the composite film and taken up by the lower temperature gas stream, thereby effecting heat and moisture exchange between the gas streams adjacent each side of the barrier. In one embodiment the porous polymeric component of the composite film comprises a porous polytetrafluoroethelyene membrane. In another embodiment the non-porous water-vapor-permeable polymeric component of the composite film comprises a hydrophilic polyurethane polymer.

The inventive heat and moisture exchange apparatus may be interposed between make-up and exhaust air streams. The exchanger housing, on its internal and external faces with respect to the building, may be largely translucent or transparent to visible light such that substantial amounts of visible light may be transmitted through the device from the housing exterior to the housing interior. In another embodiment, the internal and external faces of the exchanger housing are double-glazed panels.

In accordance with another embodiment, a preheat apparatus coupled in fluid communication with the exchanger apparatus, comprises a housing having an exterior wall defining an internal channel through which a gas stream may pass. At least a portion of the exterior wall is made of a light-transmitting material. One or more heating elements capable of absorbing incident solar radiation when exposed to such radiation, discharges absorbed heat into the a gas stream when immersed within or placed adjacent to the gas stream. The preheat apparatus may be interposed into the makeup air stream at a point upstream of the exchange apparatus, thereby raising the temperature and water vapor pressure of the make-up air stream as it flows through the preheat apparatus. The preheat apparatus may be integrated into the building enclosure system such that it is exposed to incident solar radiation when available. In yet another embodiment, the energy absorbing components of the preheat apparatus comprise photovoltaic cells or films mounted on a substructure. In an alternative embodiment, the energy absorbing components of the preheat apparatus are aluminum pieces shaped and configured in such a way as to provide maximum exposure to incident solar radiation and maximum contact with the makeup air stream.

The preheat assembly may be contained within a preheat housing or enclosure containing the preheat assembly immersed within or positioned to make contact with the make-up air stream. Such preheat housing itself may form all or part of the enclosure system of the building. The preheat housing, on its internal and external faces with respect to the building, may be largely translucent or transparent to visible light, such that substantial amounts of visible light may be transmitted through the apparatus from the exterior to the interior. In still another embodiment, the external face of the preheat housing may be a double-glazed panel.

According to another aspect of the invention, a method for exchanging heat and moisture between a first gas stream having a higher water content and a second gas stream having a lower water content comprises the steps of separating the first gas stream and the second gas stream with a water vapor permeable barrier and controlling the pressure of the first gas stream and second gas stream to enable exchange of heat and moisture between the streams. The method further includes the steps of exposing one or both of the gas streams to a source of light energy.

DESCRIPTION OF THE DRAWINGS

A more complete understanding of the invention may be obtained from a consideration of the following detailed description in conjunction with the drawings in which.

DETAILED DESCRIPTION

The heat and moisture exchange apparatus of the present invention is described with reference to FIGS. 1A–4B, which are presented for illustrative purposes only and are not intended to be limiting. The related ductwork, fans, blowers and other equipment of the attendant heating/ ventilation/air conditioning (HVAC) system which are coupled in substantially sealed fluid communication with the apparatus and which serve as the sources of exhaust and make-up air streams are within the scope of understanding of those reasonably skilled in the art and will not be described or illustrated herein for brevity sake.

Figure 1A:
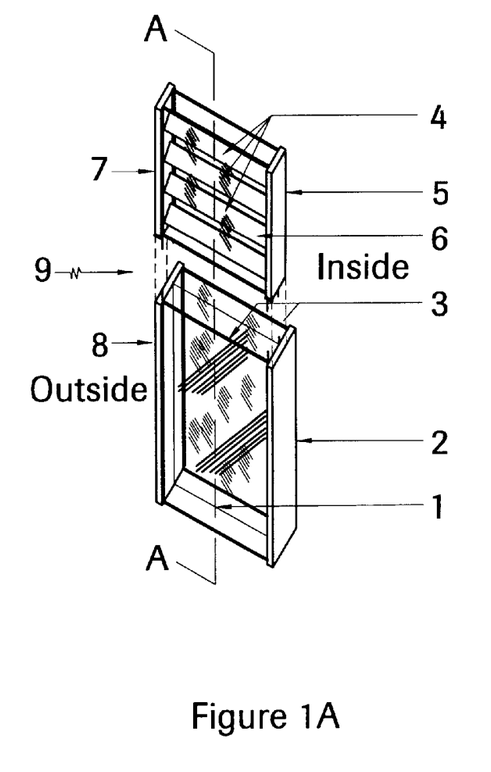
FIG. 1A is a perspective view of a single sheet moisture and heat exchange apparatus in accordance with the present invention.
Figure 1B:
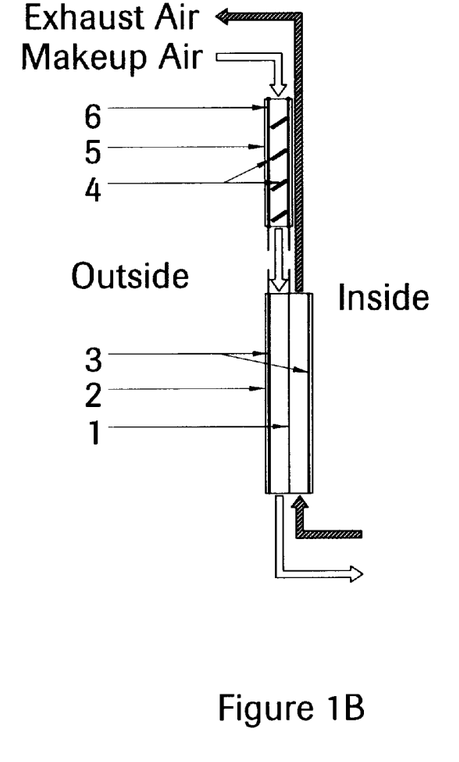
FIG. 1B is a side cross-section view of the apparatus of FIG. 1A along line A—A.

Referring to FIGS. 1A–B, a heat and moisture exchange assembly (9) comprises a preheat apparatus (7) and an exchange apparatus (8) coupled in fluid communication with each other. Although not illustrated in FIGS. 2A–4B, the preheat apparatus (7) may be utilized with the exchanger apparatus (8) of FIGS. 2A–4B in a manner similar to the embodiment illustrated in FIGS. 1A–B.

In the illustrative embodiment of FIGS. 1A–B, exchanger apparatus (8) comprises an exchanger housing (2), panels (3) and water vapor permeable barrier (1), as described in further detail hereinafter. Preheat assembly (7) comprises a preheat housing (5), panels (6), and a heating element(s) (4), as further described in greater detail hereinafter.

Exchanger housing (2) of exchanger apparatus (8) may be implemented, in the illustrative embodiment, as a rigid frame into which panels (3) are received. Specifically, exchanger housing (2) may comprise a pair of upright supports formed of a metal, such as extruded aluminum, or other rigid material and having means such as indentations, slits or brackets on the interior facing surfaces thereof to receive panels (3). Exchanger housing (2) may have the dimensions and attachment features of a mullion which enables exchanger housing (2) to form part of a standard curtainwall architectural system. In this manner, the housing may extend from the floor to the ceiling of a structure and may be connectable, with a substantially air tight seal, through conventional couplings to the under floor and ceiling voids of a structure, as well as to the sources of make-up and exchange air contained therein.

Alternatively, exchanger housing (2) may contain brackets or conventional couplings which enable one or more exchanger apparatus (8) to be stacked vertically or juxtapositioned side by side (not shown). Two or more exchanger apparatus modules may be stacked vertically using conventional coupling and sealing techniques so that a substantially airtight seal is formed between the sub channels which carry the makeup and exhaust air stream. Such couplings and attachment mechanisms will be readily understood by those reasonably skilled in the relevant arts. For example, exchanger housing (2) may further include brackets extending between the upright supports of the frame which may be used to secure panels (3) as well as barrier (1) within the exchanger housing (2). The particular configuration and implementation of such mechanisms depend on the shape and placement of barrier (1) within the interior channel of exchanger housing (2).

Panels (3) are received into the rigid frame of exchanger housing (2) and may be secured therein by friction, bolts, brackets, adhesives, etc. or other conventional mechanisms (not shown). The dimensions of panels (3) again may conform to a standard curtain wall system or may be determined at designer's discretion. Panels (3) may comprise glass, polycarbonate, plastic, plexiglass or other transparent or translucent materials. Due to the varying conditions of temperature and moisture content between the interior and the exterior of the exchanger housing (2) with respect to the building, a material with a good thermal resistance is desirable in order to minimize the occurrence of moisture condensation on the interior or exterior surfaces of the exchanger housing (2).

The rigid frame of exchanger housing (2) and panels (3) collectively form the exterior wall of apparatus (8) which defines an interior channel extending therethrough. A water vapor permeable barrier (1) is mounted within exchanger housing (2) so that it partitions the interior channel into separate subchannels through which exhaust air streams and make-up air streams may be coupled in fluid communication, as illustrated in FIG. 1B. The composition and construction of the water vapor permeable barrier (1), referred to hereafter as an exchange film, is described hereinafter in detail. The exchange film is attached to the rigid frame of exchanger housing (2) depending on the actual shape of the exchange film and its position within the interior channel. Brackets can be used to maintain the position of the exchange film within the exchanger housing (2).

Figure 2A:
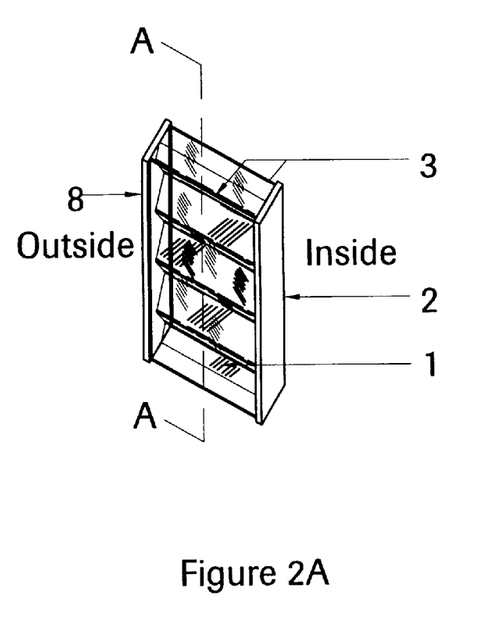
FIG. 2A is a perspective view of a folded sheet moisture and heat exchange apparatus in accordance with an alternative embodiment of the present invention.
Figure 2B:
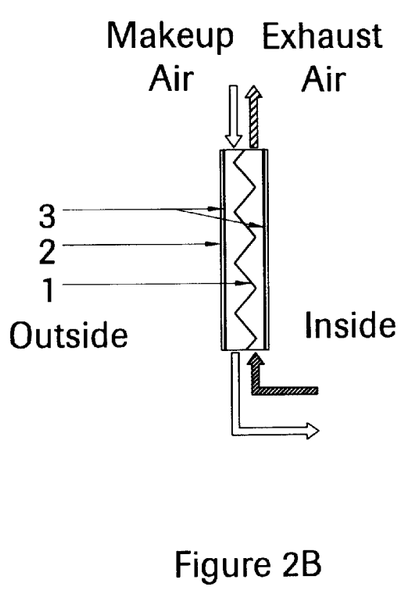
FIG. 2B is a cross-sectional view of the apparatus of FIG. 2A, along line A—A.
Figures 3A, 3B:
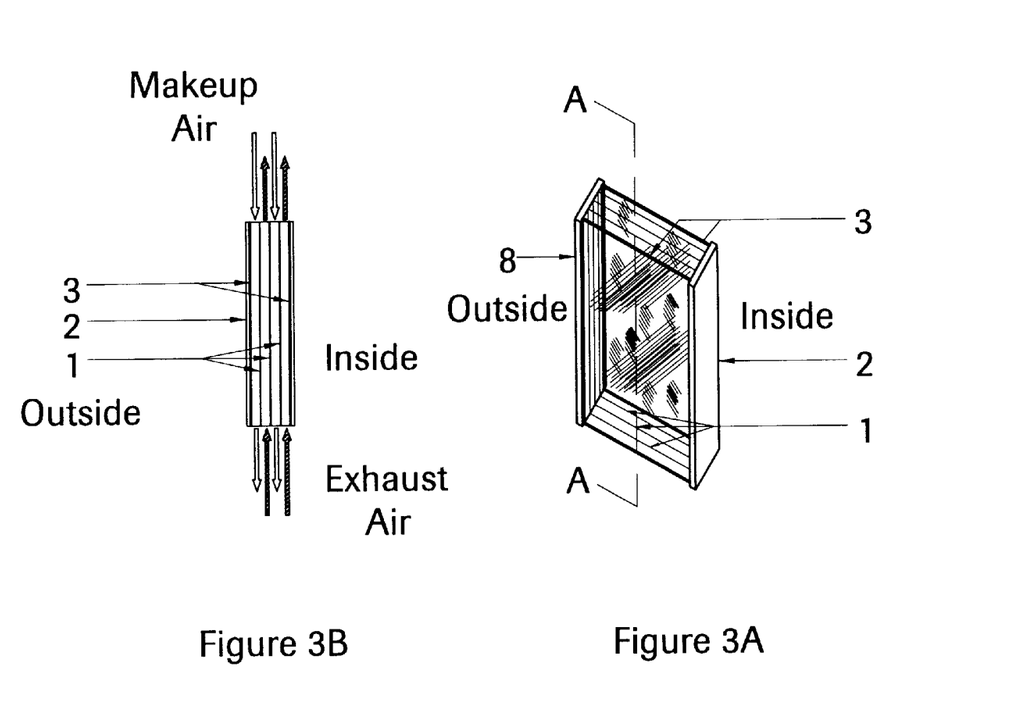
FIG. 3A is a perspective view of a multiple sheet moisture and heat exchange apparatus in accordance with another alternative embodiment of the present invention.
FIG. 3B is a cross-sectional view of the apparatus of FIG. 3A along line A—A.
Figure 4A:
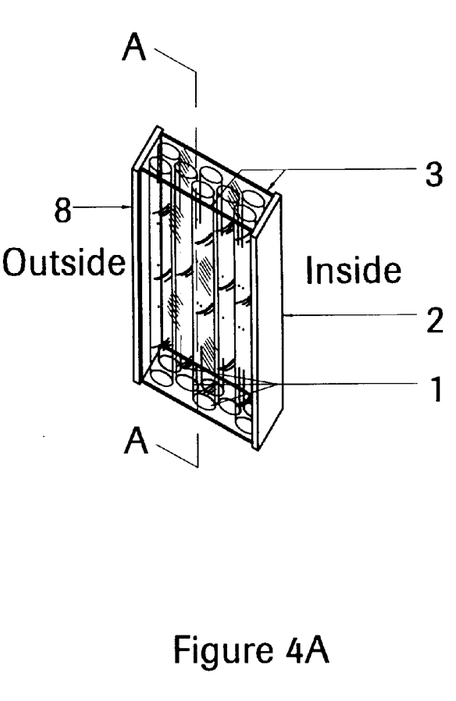
FIG. 4A is a perspective view of a shell and tube moisture and heat exchange apparatus in accordance with another alternative embodiment of the present invention.
Figure 4B:
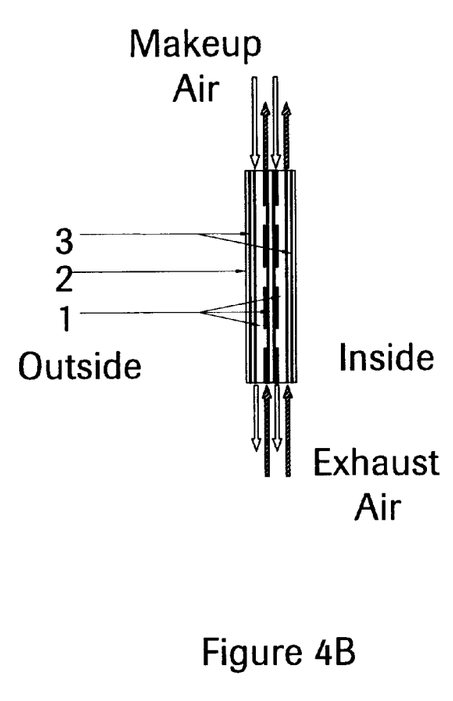
FIG. 4B is a cross-sectional view of the apparatus of FIG. 4A along line A—A.

The exchange film may be configured within the exchanger housing (2) in a number of ways to maximize the surface area of the exchange film in contact with the air streams and exposed to the visible light penetrating the exchanger housing (2). Some possible configurations for an exchange film implemented in a sheet configuration, are shown in FIGS. 1A–4B. FIGS. 1A–B illustrate a single sheet exchanger film disposed within exchanger housing (2). FIGS. 2A–B illustrate a folded or pleated sheet film. FIGS. 3A–B illustrate a multiple sheet film. FIGS. 4A–B illustrate a multiple tube film configuration. As illustrated, the composite heat and moisture exchange film may be further tailored and fashioned to enhance its surface area by, for example, pleating, folding, and the like. As shown in FIGS. 4A–B, exchange film may be folded into cylindrical tubes, and attached to the top, bottom, or both of the frame with brackets (not shown).

As mentioned previously, exchanger apparatus (8) may be used alone or in conjunction with preheat apparatus (7) to further enhance the rate of moisture exchange across barrier (1). In the illustrative embodiment, preheat apparatus (7) comprises a preheat housing (5), panels (6) and one or more heating elements (4). Preheat housing (5) may be implemented similar to exchanger housing (2). Specifically, preheat housing may comprise pair of upright supports formed of metal, such as extruded aluminum, or other rigid material and having means such as indentations, slits or brackets on the interior facing surfaces thereof to receive panels (5). Preheat housing (6) may have dimensions and attachment features similar to exchanger housing (2) so as to enable preheat apparatus (7) and exchanger apparatus (9) to be coupled in fluid communication.

Panels (6) are received into the rigid frame of preheat housing (5) and may be secured therein by friction, bolts, brackets, etc. or other conventional mechanisms. One or both of panels (6) may comprise glass, polycarbonate, or other material. Panel (6) may be made of a material having a high transmission of radiation in the spectrum of solar radiation in order to maximize the amount of radiation incident on the heating elements (4).

The rigid frame of preheat housing (5) and panel (6) collectively form an exterior wall of preheat apparatus (7) which defines an interior channel extending therethrough. One or more heating elements (4) are mounted within the interior channel, for example, on a supporting substructure extending between the upright supports of the frame preheat housing (5).

The heating elements (4) may be made of conventional photovoltaic cells or films, and mounted on a supporting structure. Alternatively, heating elements (4) may be made of metal components configured within housing (5) so that exposure to incident solar radiation is maximized. In addition, the preheat element(s) (4) may be shaped and configured so that contact with the make-up air stream, in which the apparatus is immersed or to which it is adjacent, is optimized for heat transfer from the element(s) (4) to the air stream.

Possible materials and specifications for the composite heat and moisture exchange film are described in European Patent Application Number 94308263.6, published as EP 0 661 502 A3. In the illustrative embodiment, the exchange film comprises a porous polymeric membrane coated and/or impregnated with a water-vapor-permeable polymeric material. The water-vapor-permeable polymeric material is coated on or impregnated into the porous membrane in a manner such that it forms a non-porous barrier to bulk flow of air or other gases through the heat exchange film.

The porous polymeric membrane may have a nominal pore size in the range 0.01 to 10 micrometers, a pore volume in the range 50 to 98 percent; and a thickness in the range 5 to 100 micrometers.

The porous membrane of the exchange film can be made of a broad variety of materials and has a use-temperature range that can accommodate manufacturing methods and temperatures encountered in home, office, and industrial climates. Also, the material of the porous membrane should have good chemical resistance so that it can withstand exposure to chemicals encountered in such environments. Suitable materials may include, but are not limited to polyethylene, polypropylene, polycarbonates, and fluoropolymers such as polytetrafluoroethylene, tetrafluoroehylene/(perfluoroalkyl) vinyl ether copolymer, tetrafluoroethylene/hexafluoropropylene copolymer, polyvinyl fluoride, polyvinylidene fluoroide, and the like. Fluoropolymers are suitable because of their broad use-temperature range and high chemical resistance. Porous materials of polytetrafluoromethylene are suitable.

Porous polytetrafluoroethylene membranes suitable for use in the invention can be made by processes known in the art, for example, by stretching or drawing processes, by papermaking processes, by processes in which filler materials are incorporated with the PTFE resin and that are subsequently removed to leave a porous structure, or by powder sintering processes. The porous polytetrafluoroethylene membrane may be porous expanded polytetrafluoroethylene membrane having a structure of interconnected nodes and fibrils, as described in U.S. Pat. Nos. 3,953,566 and 4,187,390 which fully describe the preferred material and manufacturing processes, the subject matters of those patent being incorporated herein by reference for all purposes.

The water-vapor-permeable polymeric material which is coated on or impregnated into the porous membrane is applied so as to form a non-porous barrier to bulk flow of air or other gases. The water-vapor-permeable polymeric material may be applied to the porous membrane so that it is in the range 1 to 20 micrometers thick. The thickness of the water-vapor-permeable polymeric material may be in the range 5 to 60 percent of the thickness of the composite heat exchange membrane.

The water-vapor-permeable polymeric material should form a non-porous barrier to bulk flow of air or other gases that has an air-flow permeability of at least 5000 Gurley Number. The Gurley Number is the time (in seconds) for 100 cubic centimeters of air to flow through 1 square inch (6.45 $cm^2$) at a pressure of 4.88 inches (12.4 cm) of water. Thus, the higher the Gurley Number the lower the flow. Preferably, the water-vapor-permeable polymeric barrier material will permit no air flow through it all.

On the other hand, the water-vapor-permeable polymeric barrier material should have a high water vapor transmission rate (WVTR). The water-vapor-permeable barrier material should have a WVTR of at least 30,000 $g/m^2/24$ hours as measured by the procedures given in Japanese Industrial Standard JIS L 1099B-1.

Hydrophilic polymers that have hydroxyl groups, carboxyl groups, sulfonic acid groups, amino groups, and the like, that are water swellable but water insoluble, can be used as the water-vapor-permeable polymeric material of the invention. Examples of such hydrophilic polymers include, but are not limited to, partially cross-linked polyvinyl alcohols, cellulose acetate, cellulose nitrate, polyamino acids, polyurethanes, hydrophilic fluorine-containing polymers, and the like. Hydrophilic silicone-based polymers can also be used. Hydrophilic polyurethane polymers and fluorine-containing moisture permeable polymers are preferred for their heat resistance, chemical resistance, and workability.

Polyurethane polymers that demonstrate good flux of water vapor through them tend to be hydrophilic block copolymers wherein the hydrophilic soft segment is found in excess of 50% by weight of the copolymer and is of the polyoxyethylene chemical family. Such polymers are usually obtained through a reaction in which the starting materials are a polyisocyanate compound and a polyol having high hydrophilicity, such as polyoxyethylene glycol. A plolyoxyalkylene polyol can also be used if increased moisture permeability or increased curing rate is desired. Such materials can be cured by reaction with the moisture present in air, or may be combined with curing agents, for example diols and diamines, in two-part systems for more rapid curing. The materials can also include catalysts and other reactive additives to permit curing by ultraviolet radiation, electron beam radiation, and the like. Many hydrophilic polyurethane polymers are commercially available, and can be used as the water-vapor-permeable polymeric material of the invention. Water-vapor-permeable copolymers having fluorine-containing components can also be used favorably.

Another suitable fluorine-containing material for the water-vapor-permeable polymeric material of the invention is a hydrophophilic fluorine-containing copolymer comprising units of a fluorine-containing ethylenically unsaturated monomer and units of a non-fluorinated vinyl monomer containing a hydrophilic functional group, where the fluorine content of the hydrophilic fluorine-containing polymer is between 2 and 60 percent, by weight of the copolymer, and the ratio of the formula weight of the recurring units of the copolymer to the number of functional groups is between 45 and 700. Such a hydrophilic fluorine-containing copolymer is fully disclosed in U.S. Pat. No. 5,130,024, the subject matter of which is incorporated herein by reference.

The water-vapor permeable polymeric material can be applied to the porous polymeric membrane to form the exchange film by conventional means such as by doctor blade coating, or by roll-coating methods involving gravure rolls, reverse rolls, kiss-coating rolls, and the like. The water-vapor-permeable polymeric material can also be prepared as free-standing film and laminated to the porous membrane by conventional means such as by use of adhesives, or in the case of heat bondable materials, by application of heat and pressure. When the water vapor permeable polymeric material is a polyurethane copolymer the method used can be to mix polyol and polyisocyanate components, apply the mixture to coat or impregnate the porous membrane, and heat the composite film to cure the copolymer. Solvent dilution of the mixture can be used to control the viscosity of the mixture if desired. When the water-vapor-permeable polymeric material is a fluorine-containing copolymer a suitable method can be to dissolve the copolymer in an alcohol, ketone, ester, amide, hydrocarbon, or other conventional drying methods. Likewise, when a silicone-based copolymer is used, it can be dissolved in toluene or other suitable organic solvent, coated on or impregnated into the porous membrane, and dried by conventional techniques.

When the water-vapor permeable polymeric material is impregnated into the porous membrane to form the non-porous barrier it is generally necessary to dilute or dissolve the material with a solvent to obtain a suitable liquid viscosity for impregnation. The viscosity of the solution should be adjusted to be in the range 0.1 to 5 poise. The polymer content of the solution is usually in the range 5 to 70 weight percent. Impregnation should be done so that all the pores extending from one surface of the porous polymeric membrane are essentially completely filled with the cured water-vapor-permeable polymeric material, thus forming a non-porous barrier within the porous membrane that prevents air flow through the membrane. Accordingly, 50 to 95 percent, of the pores in the porous membrane are free of the water-vapor-permeable polymeric material.

As noted earlier, the water-vapor-permeable polymeric material can be applied to the porous polymeric membrane to form a coating on the surface of the membrane. The exchange film can also be made with the water-vapor-permeable polymeric material forming a non-porous coating on one surface and, additionally, be partially impregnated into the porous membrane below the surface.

In order to improve strength and handleability the exchange film can, optionally, be laminated to a woven, knitted, or non-woven cloth for reinforcement. The reinforcing cloth should have an open, highly porous structure and should be as thin as possible while still possessing the required strength. Lightweight woven, knitted, or non-woven cloth of synthetic polymers, weighing in the range 5 to 100 g/m$^2$, are suitable for the purpose and are generally in the range 150 to 350 micrometers thick.

The reinforcing cloth and exchange film can be laminated by conventional methods and equipment well known in the art. If an adhesive is used for lamination it should be applied to a surface to be laminated in a manner that minimizes blocking the open, porous structure of the reinforcing cloth. For example, the adhesive can be applied as discrete dots by gravure printing methods, or applied by kiss-coating the adhesive onto the high spots of the cloth, or other like methods. The adhesive may occupy 35 percent or less, of the surface area of the material to which it is applied. If the reinforcing cloth is made of a thermoplastic polymer having a suitable melt temperature, conventional heat-bonding methods, such as application of heat and pressure by platen presses or heated rolls may be used.

Another option for the exchange film of the present invention is to give the porous polymeric membrane and/or the reinforcing cloth a treatment to make the interior pores surfaces hydrophilic. Such a treatment is useful when the exchange film is to be used in an environment where excess water is present or condensation is likely. By making the interior pore surfaces hydrophilic liquid water will wet the surfaces, evaporate more readily or run down the exchanger film, and will not collect in the form of droplets that reduce heat exchange efficiency within the porous structures. A suitable hydrophilic treatment that substantially preserves the porous nature of the materials treated is disclosed in U.S. Pat. No. 5,130,024 the subject matter of which is incorporated herein by reference. Other suitable hydrophilizing treatments are also known in the art, and can be used.

The exchange film of the present invention may be manufactured in accordance with any of the materials and processes described above. In addition, a composite exchange film having dimensions larger than those available in commercial products may be formed by joining one or more smaller exchange films by processes such as cold welding or seaming or other techniques understood by those skilled in the arts.

The theory of operation of exchanger (8) and preheat assembly (7) are described as follows. The reader will appreciate that exchanger assembly (8) may function separate and independently of preheat assembly (7) and still achieve the objectives of the invention. Preheat assembly (7) serves to further enhance the performance of exchange apparatus (8). An exchange apparatus (8) is coupled in fluid communication with the duct work of both a makeup and exhaust air stream within a building structure. For example, in the illustrative embodiment, exchange apparatus (8) has the dimensions of a curtainwall panel extending from the floor to the ceiling of a structure and is coupled to duct work for the makeup and exhaust air streams through floor and ceiling voids. In the illustrative embodiment, the makeup airstream is coupled to the subchannel of exchanger housing (2) which is adjacent the exterior of the building, as illustrated in FIGS. 1A–4B. In the illustrative embodiment, the sources of makeup and exhaust air, typically blowers and fans and their accompanying equipment generate makeup and exhaust air streams having positive or negative pressure gradients. By manipulating the pressure within the HVAC system and the exchange apparatus (8), the makeup air stream flows may be made to flow in a direction opposite to the direction of the exhaust air stream. In this manner, exchange of heat and moisture between the respective streams across the exchange film is enhanced.

In the illustrative embodiment, the makeup air stream is exposed to incident solar radiation, or another source of light energy and is heated thereby. The increased heat within the makeup airstream raises the vapor pressure in the makeup air stream which typically has a higher moisture content than the exhaust stream. Accordingly, a vapor pressure gradient develops across the exchange film since the makeup air stream has a higher vapor pressure than the exhaust air stream. The vendor will note that vapor pressure is a function both of moisture content and of temperature. It is conceivable that an airstream may have a lower moisture content but still have a higher vapor pressure if it were at a very high temperature. Such a gradient causes water vapor to permeate the exchange film from the makeup air stream to the exhaust air stream where it is vacated from the structure. The heating of the makeup air stream with incident light energy solely or in combination with preheat apparatus (7) further increases the vapor pressure in the makeup airstream thereby increasing the rate of moisture transfer through the membrane of the exchange film. In addition, incident light on the exchange film further increases the film temperature and enhances the rate of moisture exchange from the makeup stream through to the exhaust air stream.

In this manner, the exchange apparatus (8) as described herein serves as a mechanism for enhanced moisture and heat exchange between makeup and exhaust air streams and utilizes solar radiation to increase the rate of such exchange. In addition, depending on the configuration of the exchange film within the exchange housing (2), ambient light from the exterior of the exchange apparatus is transmitted through the panels (3) and into the interior of the structure to enhance the ambient environment and aesthetics of the structure interior, and possibly to reduce the amount of power required to light the interior artificially.

Evidence of the effectiveness of the moisture and heat exchange apparatus of the present invention is corroborated by the test data set forth in Tables 1–4, in which the units have the following definitions: Tdb is the airstream dry bulb temperature in degrees centigrade (C); Twb is the airstream screen wetbulb temperature in degrees centigrade (C); U is the mean airstream velocity measured at the exit orifice in meters per second (M/s); X is the airstream moisture content in kg moisture/kg moist air; and VFR is the volumetric air flow rate in meters cubed per second ($M^3$/s). The experimental uncertainty in Data Set 2.1 of Table 3 is: Tdb±0.1 C; Twb±0.1 C; and U±0.25 M/s.

Figure 5A:
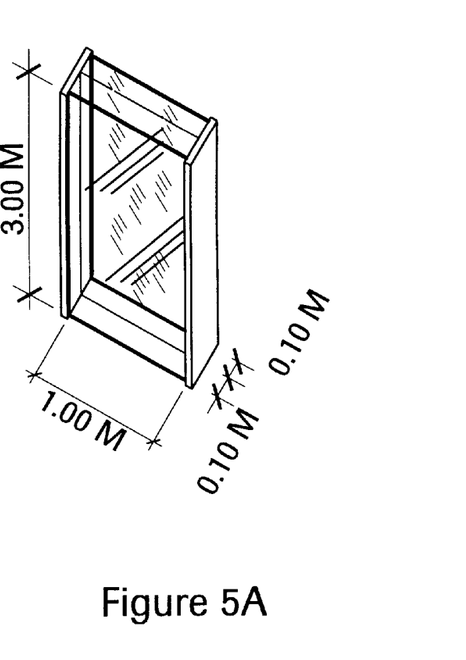
FIG. 5A is a perspective view of a single sheet moisture and heat exchange apparatus in accordance with the present invention.
Figure 5B:
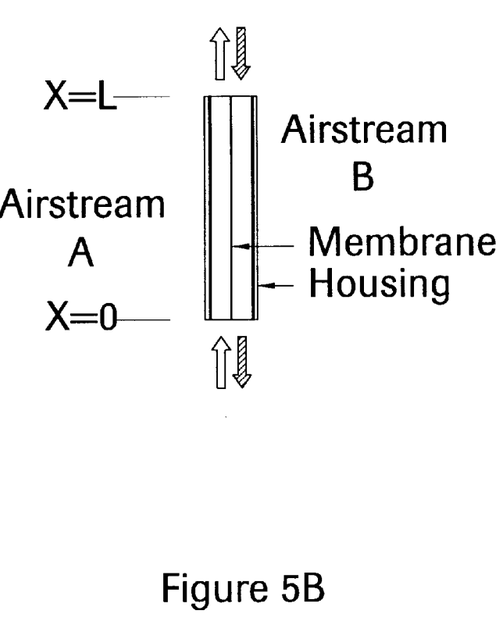
FIG. 5B is a side cross-section view of the apparatus of FIG. 5A.

The test results in Tables 1–2 relate to the embodiment of the invention of FIGS. 5A–5B which illustrates a single-barrier exchanger having the dimension as shown, an area of 3.0 $m^2$ and air stream passage depths of 0.1 m. In addition, the thermal conductivity of the exchanger housing was assumed to be 0.0 $W/m^2 k$. In addition, for a hypothetical exchange film barrier made of a Polydimtheylsiloxane composite, the permeability to water vapor was assumed to be $2.20 \times 10^{-2}$ $m^3/m^2$ Pa, the selectivity over air was assumed to be 100000 and the thermal conductivity was assumed to be $8.63 \times 10^{-1}$ $W/m^2$ K. The performance of the exchanger of FIGS. 5A–B was calculated under 29 different inlet conditions by two separate mathematical methods. The first set of results, Data Set 1.1, as set forth in Table 1, was derived by modeling the exchanger using implicit-integration, finite-volume computational fluid dynamics software. The modeling was using STAR CD a computational fluid dynamics program employing a finite volume, implicit integration, Navier-Stokes solver on a two dimensional, 20×300 cell model. The STAR CD program is commercially available from Compilation Dynamics Ltd. Of London, United Kingdom.

The second set of results Data Set 1.2, as set forth in Table 2, was calculated by determining solutions to equations for conservation of mass, conservation of momentum, and conservation of energy as set forth below:

Conservation of Mass: $\quad \dfrac{dM_{1_a}}{dx} = -\dfrac{\Phi_i}{WU_a} - \dfrac{M_{1_a}}{T_a}\dfrac{dT_a}{dx}$ Conservation of Momentum: $\quad \dfrac{dU_a}{dx} = \dfrac{U_a}{T_a}\dfrac{dT_a}{dx}$ -continued Conservation of Energy: $\quad \dfrac{dT_a}{dx} = \dfrac{-\Phi_i[C_1(T_s - T_a) + C_2 T_a] - \lambda(T_a - T_b)}{(C_1 M_{1_a} + C_2 M_{2_a})U_a W}$ These equations were then used in a stepwise integration along the length of the same exchanger to determine the inlet and outlet conditions.

Figure 6A:
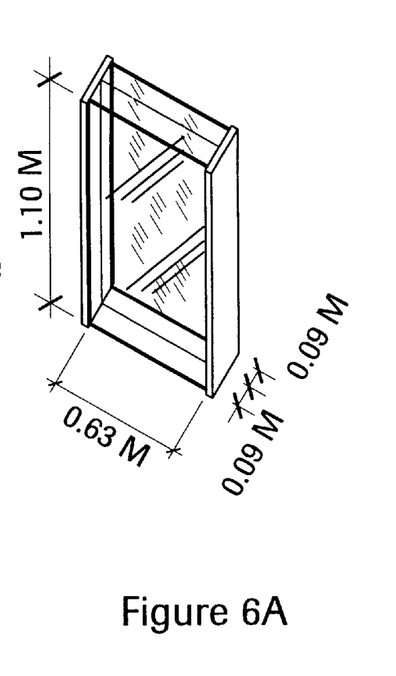
FIG. 6A is a perspective view of a single sheet moisture and heat exchange apparatus in accordance with the present invention.
Figure 6B:
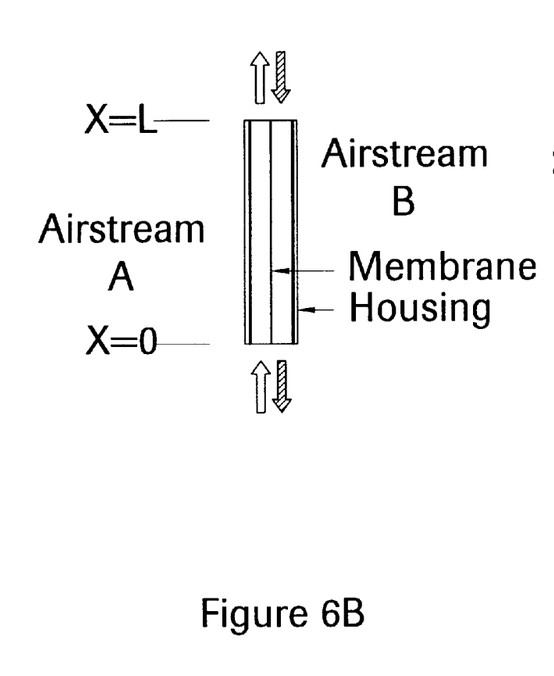
FIG. 6B is a side cross-section view of the apparatus of FIG. 6A.

The test results in Tables 3–4 relate to the embodiment of the invention of FIGS. 6A–6B which illustrate a single-plate barrier exchanger having the dimension as shown, an area of 0.693 $m^2$ and air stream passage depths of 0.1 m. In addition, the thermal conductivity of the exchanger housing of the embodiment of FIGS. 6A–B was at $1.07 \times 10^5$ $W/m^2$ K. Further, the exchange film of the exchanger of FIGS. 6A–6B was modeled with a polydimtheylsiloxane composite film commercially available from G.K.S.S., Geesthacht, Germany, and has a permeability to water vapor of $7.59 \times 10^{-9}$ $m^3/m^2 s$/Pa, selectivity over air of a 1000 and thermal conductivity of $7.81 \times 10^4$ $W/m^2$ K. The performance of the exchanger of FIGS. 6A–6B was measured under 16 different inlet conditions using an experimental apparatus. The resulting third set of data, Data Set 2.1, is set forth in Table 3. The performance of the exchanger of FIGS. 6A–6B under the same 16 conditions was also calculated by determining solutions to equations for conservation of mass, conservation of momentum, and conservation of energy as set forth previously. These equations were then used in a stepwise integration along the length of the same exchanger to determine the inlet and outlet conditions in a manner similar to Data Set 1.2. The resulting fourth set of data, Data Set 2.2, is set forth in Table 4.

The reader will appreciate that the inventive heat and moisture and exchange apparatus, alone or in combination with the disclosed preheat assembly, has a number of advantages over prior art exchanger apparatus. First, the exchanger may be designed and dimensioned to be integrated, as an architectural component, into the exterior walls or facades of a structure, in a manner similar to a window. In this manner, the inventive exchanger is able to utilize the ambient heat and light from the environment to enhance the exchange process as well as to improve the interior environment of the structure. Next, the surface area of an exchange film, as described, results in efficient moisture transfer between makeup and exhaust streams within the HVAC system of a structure. In addition, the large cross-sectional area of the airflow channel through the exchanger apparatus results in a low pressure drop in the respective air flow streams thereby conserving the amount of energy utilized by the blowers, fans, motors and other components of the HVAC system.

Although various exemplary embodiments of the invention have been disclosed, it will be apparent to those skilled in the art that various changes and modifications can be made which will achieve some of the advantages of the invention without departing from the spirit and scope of the invention.

TABLE 1

DATA SET 1.1: RESULTS CALCULATED USING CFD

| Test No. | SIDE A | | | | | SIDE B | | | | |
|---|---|---|---|---|---|---|---|---|---|---|
| | X = 0 | | | X = L | | X = 0 | | | X = L | |
| | Tdb | x | VFR | Tdb | x | Tdb | x | VFR | Tdb | x |
| 1 | 25.00 | 0.0100 | 0.0020 | 26.74 | 0.0132 | 26.99 | 0.0160 | 0.0020 | 24.97 | 0.0130 |
| 2 | 24.99 | 0.0100 | 0.0020 | 26.64 | 0.0153 | 26.98 | 0.0200 | 0.0020 | 24.88 | 0.0150 |
| 3 | 25.00 | 0.0100 | 0.0058 | 26.77 | 0.0122 | 26.99 | 0.0130 | 0.0057 | 25.07 | 0.0120 |
| 4 | 25.00 | 0.0100 | 0.0058 | 26.69 | 0.0145 | 26.99 | 0.0160 | 0.0057 | 24.99 | 0.0150 |
| 5 | 25.00 | 0.0100 | 0.0058 | 26.58 | 0.0174 | 26.99 | 0.0200 | 0.0057 | 24.90 | 0.0170 |
| 6 | 25.00 | 0.0100 | 0.0126 | 26.70 | 0.0126 | 27.00 | 0.0130 | 0.0125 | 25.18 | 0.0130 |
| 7 | 25.00 | 0.0100 | 0.0251 | 26.57 | 0.0128 | 27.00 | 0.0130 | 0.0250 | 25.37 | 0.0130 |
| 8 | 25.00 | 0.0100 | 0.0252 | 26.53 | 0.0155 | 26.95 | 0.0160 | 0.0250 | 25.33 | 0.0160 |
| 9 | 25.00 | 0.0100 | 0.0252 | 26.48 | 0.0192 | 26.99 | 0.0200 | 0.0250 | 25.30 | 0.0200 |
| 10 | 25.01 | 0.0100 | 0.0021 | 30.58 | 0.0116 | 30.98 | 0.0130 | 0.0020 | 25.25 | 0.0120 |
| 11 | 25.01 | 0.0100 | 0.0021 | 30.98 | 0.0132 | 30.98 | 0.0160 | 0.0020 | 25.18 | 0.0130 |
| 12 | 25.00 | 0.0100 | 0.0021 | 30.40 | 0.0153 | 30.40 | 0.0150 | 0.0020 | 25.09 | 0.0150 |
| 13 | 25.00 | 0.0100 | 0.0021 | 30.20 | 0.0195 | 30.99 | 0.0280 | 0.0020 | 24.91 | 0.0200 |
| 14 | 25.01 | 0.0100 | 0.0058 | 30.44 | 0.0122 | 30.98 | 0.0130 | 0.0057 | 25.33 | 0.0120 |
| 15 | 25.01 | 0.0100 | 0.0058 | 30.35 | 0.0144 | 30.98 | 0.0160 | 0.0057 | 25.26 | 0.0140 |
| 16 | 25.00 | 0.0100 | 0.0058 | 30.24 | 0.0174 | 30.98 | 0.0200 | 0.0057 | 25.00 | 0.0170 |
| 17 | 25.00 | 0.0100 | 0.0059 | 30.02 | 0.0233 | 30.97 | 0.0280 | 0.0057 | 24.97 | 0.0230 |
| 18 | 25.00 | 0.0100 | 0.0127 | 30.12 | 0.0151 | 30.99 | 0.0160 | 0.0125 | 25.56 | 0.0150 |
| 19 | 25.01 | 0.0100 | 0.0254 | 29.72 | 0.0128 | 30.99 | 0.0130 | 0.0250 | 26.13 | 0.0130 |
| 20 | 25.01 | 0.0100 | 0.0254 | 29.69 | 0.0155 | 30.99 | 0.0160 | 0.0250 | 26.10 | 0.0160 |
| 21 | 25.01 | 0.0100 | 0.0254 | 29.65 | 0.0192 | 30.99 | 0.0200 | 0.0250 | 26.06 | 0.0190 |
| 22 | 25.01 | 0.0100 | 0.0254 | 29.56 | 0.0266 | 30.98 | 0.0280 | 0.0250 | 25.99 | 0.0270 |
| 23 | 25.02 | 0.0100 | 0.0254 | 33.39 | 0.0116 | 33.97 | 0.0130 | 0.0020 | 25.39 | 0.0120 |
| 24 | 25.01 | 0.0100 | 0.0021 | 33.31 | 0.0131 | 33.97 | 0.0160 | 0.0020 | 25.32 | 0.0130 |
| 25 | 25.01 | 0.0100 | 0.0021 | 33.21 | 0.1520 | 33.96 | 0.0200 | 0.0020 | 25.23 | 0.0150 |
| 26 | 25.00 | 0.0100 | 0.0021 | 33.01 | 0.0194 | 33.96 | 0.0280 | 0.0020 | 25.06 | 0.0190 |
| 27 | 25.01 | 0.0100 | 0.0021 | 33.17 | 0.0122 | 33.98 | 0.0130 | 0.0057 | 25.51 | 0.0120 |
| 28 | 25.01 | 0.0100 | 0.0059 | 33.08 | 0.0144 | 33.97 | 0.0160 | 0.0057 | 25.44 | 0.0140 |
| 29 | 25.01 | 0.0100 | 0.0059 | 32.97 | 0.0174 | 33.97 | 0.0200 | 0.0057 | 25.34 | 0.0170 |

TABLE 2

DATA SET 1.2: RESULTS CALCULATED USING STEPPED INTEGRATION

| Test No. | SIDE A | | | | | SIDE B | | | | |
|---|---|---|---|---|---|---|---|---|---|---|
| | X = 0 | | | X = L | | X = 0 | | | X = L | |
| | Tdb | x | VFR | Tdb | x | Tdb | x | VFR | Tdb | x |
| 1 | 25.00 | 0.0100 | 0.0020 | 26.99 | 0.0132 | 26.99 | 0.0160 | 0.0020 | 25.06 | 0.0130 |
| 2 | 24.99 | 0.0100 | 0.0020 | 26.98 | 0.0164 | 26.98 | 0.0200 | 0.0020 | 25.14 | 0.0160 |
| 3 | 25.00 | 0.0100 | 0.0058 | 26.94 | 0.0122 | 26.99 | 0.0130 | 0.0057 | 25.04 | 0.0120 |
| 4 | 25.00 | 0.0100 | 0.0058 | 26.99 | 0.0141 | 26.99 | 0.0160 | 0.0057 | 25.04 | 0.0140 |
| 5 | 25.00 | 0.0100 | 0.0058 | 26.95 | 0.0163 | 26.99 | 0.0200 | 0.0057 | 25.05 | 0.0160 |
| 6 | 25.00 | 0.0100 | 0.0126 | 26.94 | 0.0121 | 27.00 | 0.0130 | 0.0125 | 25.04 | 0.0120 |
| 7 | 25.00 | 0.0100 | 0.0251 | 26.86 | 0.0121 | 27.00 | 0.0130 | 0.0250 | 25.08 | 0.0120 |
| 8 | 25.00 | 0.0100 | 0.0252 | 26.88 | 0.0140 | 26.95 | 0.0160 | 0.0250 | 25.07 | 0.0140 |
| 9 | 25.00 | 0.0100 | 0.0252 | 26.92 | 0.0162 | 26.99 | 0.0200 | 0.0250 | 25.08 | 0.0160 |
| 10 | 25.01 | 0.0100 | 0.0021 | 30.84 | 0.0122 | 30.98 | 0.0130 | 0.0020 | 25.03 | 0.0120 |
| 11 | 25.01 | 0.0100 | 0.0021 | 30.50 | 0.0141 | 30.98 | 0.0160 | 0.0020 | 25.04 | 0.0140 |
| 12 | 25.00 | 0.0100 | 0.0021 | 30.85 | 0.0164 | 30.40 | 0.0150 | 0.0020 | 25.06 | 0.0160 |
| 13 | 25.00 | 0.0100 | 0.0021 | 30.87 | 0.0203 | 30.99 | 0.0280 | 0.0020 | 25.01 | 0.0200 |
| 14 | 25.01 | 0.0100 | 0.0058 | 30.81 | 0.0121 | 30.98 | 0.0130 | 0.0057 | 25.08 | 0.0120 |
| 15 | 25.01 | 0.0100 | 0.0058 | 30.82 | 0.0141 | 30.98 | 0.0160 | 0.0057 | 25.12 | 0.0140 |
| 16 | 25.00 | 0.0100 | 0.0058 | 30.82 | 0.0163 | 30.98 | 0.0200 | 0.0057 | 25.10 | 0.0160 |
| 17 | 25.00 | 0.0100 | 0.0059 | 30.82 | 0.0199 | 30.97 | 0.0280 | 0.0057 | 25.11 | 0.0200 |
| 18 | 25.00 | 0.0100 | 0.0127 | 30.78 | 0.0140 | 30.99 | 0.0160 | 0.0125 | 25.15 | 0.0140 |
| 19 | 25.01 | 0.0100 | 0.0254 | 30.72 | 0.0121 | 30.99 | 0.0130 | 0.0250 | 25.20 | 0.0120 |
| 20 | 25.01 | 0.0100 | 0.0254 | 30.73 | 0.0140 | 30.99 | 0.0160 | 0.0250 | 25.20 | 0.0140 |
| 21 | 25.01 | 0.0100 | 0.0254 | 30.74 | 0.0162 | 30.99 | 0.0200 | 0.0250 | 25.21 | 0.0160 |
| 22 | 25.01 | 0.0100 | 0.0254 | 30.75 | 0.0196 | 30.98 | 0.0280 | 0.0250 | 25.22 | 0.0200 |
| 23 | 25.02 | 0.0100 | 0.0254 | 33.70 | 0.0122 | 33.97 | 0.0130 | 0.0020 | 25.06 | 0.0120 |
| 24 | 25.01 | 0.0100 | 0.0021 | 33.69 | 0.0141 | 33.97 | 0.0160 | 0.0020 | 25.03 | 0.0140 |
| 25 | 25.01 | 0.0100 | 0.0021 | 33.71 | 0.0164 | 33.96 | 0.0200 | 0.0020 | 25.04 | 0.0160 |
| 26 | 25.00 | 0.0100 | 0.0021 | 33.72 | 0.0203 | 33.96 | 0.0280 | 0.0020 | 25.04 | 0.0200 |

TABLE 2-continued

DATA SET 1.2: RESULTS CALCULATED USING STEPPED INTEGRATION

| Test No. | SIDE A | | | | | SIDE B | | | | |
|---|---|---|---|---|---|---|---|---|---|---|
| | X = 0 | | | X = L | | X = 0 | | | X = L | |
| | Tdb | x | VFR | Tdb | x | Tdb | x | VFR | Tdb | x |
| 27 | 25.01 | 0.0100 | 0.0021 | 33.66 | 0.0122 | 33.98 | 0.0130 | 0.0057 | 25.11 | 0.0120 |
| 28 | 25.01 | 0.0100 | 0.0059 | 33.67 | 0.0141 | 33.97 | 0.0160 | 0.0057 | 25.12 | 0.0140 |
| 29 | 25.01 | 0.0100 | 0.0059 | 33.69 | 0.0163 | 33.97 | 0.0200 | 0.0057 | 25.14 | 0.0160 |

TABLE 3

DATA SET 2.1: MEASURED RESULTS

| Test No. | SIDE A | | | | | SIDE B | | | | |
|---|---|---|---|---|---|---|---|---|---|---|
| | X = 0 | | X = L | | | X = 0 | | | X = L | |
| | Tdb | Twb | Tdb | Twb | U (x = L) | Tdb | Twb | U (x = 0) | Tdb | Twb |
| 1 | 23.00 | 16.30 | 24.50 | 17.90 | 5.9 | 32.50 | 25.40 | 5.9 | 36.20 | 27.30 |
| 2 | 24.10 | 17.00 | 25.10 | 17.90 | 5.9 | 33.60 | 22.10 | 5.9 | 36.30 | 23.60 |
| 3 | 23.90 | 17.00 | 25.90 | 19.00 | 5.9 | 37.70 | 27.30 | 5.9 | 43.80 | 29.70 |
| 4 | 23.90 | 17.00 | 25.70 | 18.50 | 5.9 | 36.10 | 24.50 | 5.9 | 40.50 | 26.50 |
| 5 | 23.50 | 16.50 | 24.40 | 17.70 | 5.9 | 29.30 | 23.70 | 5.9 | 31.00 | 25.00 |
| 6 | 23.70 | 16.60 | 24.80 | 18.00 | 5.9 | 31.90 | 24.30 | 5.9 | 35.10 | 26.00 |
| 7 | 23.90 | 16.90 | 25.50 | 18.90 | 5.9 | 34.80 | 27.70 | 5.9 | 39.40 | 29.80 |
| 8 | 22.70 | 15.10 | 23.70 | 16.10 | 5.9 | 27.80 | 19.70 | 5.9 | 29.30 | 20.60 |
| 9 | 22.80 | 15.10 | 23.80 | 16.20 | 5.9 | 30.30 | 19.80 | 5.9 | 33.10 | 21.40 |
| 10 | 21.20 | 13.90 | 22.10 | 15.10 | 5.9 | 26.90 | 21.80 | 5.9 | 29.20 | 23.30 |
| 11 | 21.40 | 13.80 | 23.60 | 15.30 | 6.4 | 35.70 | 21.20 | 6.4 | 41.30 | 23.50 |
| 12 | 25.00 | 15.70 | 25.60 | 16.60 | 6.4 | 30.80 | 21.40 | 6.4 | 33.20 | 22.80 |
| 13 | 25.40 | 15.80 | 26.60 | 17.60 | 6.4 | 34.90 | 25.50 | 6.4 | 38.70 | 27.50 |
| 14 | 23.00 | 15.30 | 24.00 | 16.50 | 5.0 | 30.40 | 20.20 | 5.0 | 32.30 | 21.60 |
| 15 | 23.00 | 15.30 | 24.30 | 17.30 | 5.0 | 31.40 | 25.20 | 5.0 | 33.90 | 27.00 |
| 16 | 22.80 | 15.20 | 24.10 | 16.50 | 5.0 | 34.20 | 22.00 | 5.0 | 38.70 | 24.00 |

TABLE 4

DATA SET 2.2: CALCULATED RESULTS

| Test No. | SIDE A | | | | | SIDE B | | | | |
|---|---|---|---|---|---|---|---|---|---|---|
| | X = 0 | | X = L | | | X = 0 | | | X = L | |
| | Tdb | Twb | Tdb | Twb | U (x = L) | Tdb | Twb | U (x = L) | Tdb | Twb |
| 1 | 23.10 | 16.22 | 24.45 | 17.90 | 5.6 | 32.45 | 25.34 | 5.6 | 36.21 | 27.32 |
| 2 | 24.00 | 16.81 | 25.15 | 17.79 | 6.1 | 33.50 | 22.41 | 6.1 | 36.95 | 23.81 |
| 3 | 24.00 | 17.17 | 25.80 | 19.01 | 6.1 | 37.80 | 27.29 | 5.6 | 43.59 | 29.67 |
| 4 | 24.00 | 17.17 | 25.75 | 18.35 | 6.1 | 36.00 | 24.60 | 6.2 | 40.58 | 26.42 |
| 5 | 23.50 | 16.42 | 24.38 | 17.79 | 6.0 | 29.20 | 23.80 | 6.1 | 31.38 | 25.22 |
| 6 | 23.60 | 16.73 | 24.73 | 17.99 | 6.1 | 31.80 | 24.36 | 5.6 | 35.15 | 26.00 |
| 7 | 23.85 | 16.82 | 25.46 | 18.99 | 5.6 | 34.85 | 27.57 | 5.6 | 38.85 | 29.78 |
| 8 | 22.80 | 15.28 | 23.57 | 15.92 | 5.6 | 27.70 | 19.83 | 6.2 | 29.51 | 20.71 |
| 9 | 22.90 | 15.27 | 23.87 | 15.85 | 6.1 | 30.30 | 19.94 | 5.8 | 33.18 | 21.12 |
| 10 | 21.30 | 13.98 | 22.00 | 15.14 | 6.1 | 27.00 | 21.82 | 5.6 | 29.17 | 23.28 |
| 11 | 21.50 | 13.99 | 23.21 | 14.92 | 6.1 | 35.80 | 21.35 | 6.1 | 41.20 | 23.26 |
| 12 | 24.90 | 15.68 | 25.79 | 16.54 | 6.6 | 30.90 | 21.55 | 6.1 | 33.30 | 22.79 |
| 13 | 25.30 | 15.91 | 26.67 | 17.57 | 6.6 | 35.00 | 25.55 | 6.5 | 38.63 | 27.40 |
| 14 | 23.10 | 15.24 | 23.94 | 16.69 | 4.7 | 30.30 | 24.20 | 5.2 | 32.96 | 25.91 |
| 15 | 23.10 | 15.49 | 24.29 | 17.34 | 4.7 | 31.30 | 25.23 | 5.2 | 34.53 | 27.15 |
| 16 | 22.70 | 15.31 | 24.19 | 16.25 | 5.2 | 34.10 | 22.10 | 5.2 | 38.80 | 23.90 |

What is claimed is:

1. An apparatus for enabling heat and moisture exchange comprising:

an exchanger housing comprising an exterior wall defining an interior channel through which a gas stream may pass, at least a portion of the exterior wall comprising a light transmitting material;

a water vapor permeable barrier disposed within the interior channel and partitioning the interior channel into a plurality of separate subchannels;

a first of the subchannels adapted to receive a first gas stream at the same time a second of the subchannels is adapted to receive a second gas stream, the first gas stream flowing in a direction opposite to a direction of the second gas stream.

2. The apparatus of claim 1 wherein the exterior wall partially comprises a pair of panes of light transmitting material.

3. The apparatus of claim 1 wherein the exterior wall partially comprises a translucent material.

4. The apparatus of claim 1 wherein the exterior wall partially comprises a transparent material.

5. The apparatus of claim 1 in combination with a preheating apparatus connectable in fluid communication with one of the subchannels.

6. The combination of claim 5 wherein the preheating apparatus comprises:

a preheat housing comprising an exterior wall defining a preheat channel through which a gas stream may pass; and an energy absorbing material disposed within the preheat channel, the preheat channel being connectable to one of the subchannels of the exchanger apparatus.

7. An apparatus comprising:

a rigid frame;

a pair of panels attached to the frame, at least one of the panels formed of a light transmitting material, the rigid frame and panels collectively forming an exterior wall defining an interior channel through which a gas stream may pass; and a water vapor permeable barrier disposed within the interior channel and partitioning the interior channel into a plurality of separate subchannels, the subchannels capable of simultaneously receiving separate gas streams, a first of the subchannels connectable to a first gas stream so that the first gas stream flows through the first subchannel in a direction opposite to a direction in which a second gas stream flows through a second of the subchannels.

8. The apparatus of claim 7 in combination with a preheating apparatus connectable in fluid communication with a first of the plurality of subchannels.

9. The combination of claim 8 wherein the preheating apparatus comprises:

a rigid frame;

a pair of panels attached to the frame, at least one of the panels being light transmitting, the rigid frame and panels collectively defining a preheat channel; and an energy absorbing material disposed within the preheat channel, the preheat channel being connectable to the first subchannel of the exchanger apparatus.

10. The apparatus of claim 9 in which the energy absorbing material comprises a metal.

11. The apparatus of claim 9 in which the energy absorbing material comprises a photovoltaic cell.

12. The apparatus of claim 7 wherein the rigid frame is integrated into an exterior wall of a building.

13. A method for exchanging heat and moisture between a first gas stream and a second gas stream comprising:

(a) providing an exchanger apparatus comprising an exterior wall defining an interior channel through which a gas stream may pass, at least a portion of the exterior wall comprising a light transmitting material;

(b) separating, with a water vapor permeable barrier, the interior channel into first and second subchannels through which first and second gas streams, respectively, may simultaneously pass;

(c) controlling the pressure of the first gas stream and the second gas stream to enable the exchange of heat and moisture between the streams through the water vapor permeable barrier; and (d) exposing at least one of the gas streams in the interior channel to a source of light energy.

14. The method of claim 13 in which step (d) further comprises:

(d.1) disposing a heating element within one of the gas streams.

15. The method of claim 14 in which step (d) further comprises:

(d.2) exposing the heating element to a source of light energy.

16. The method of claim 13 wherein step (b) comprises:

(b.1) separating, with a plurality of water vapor permeable barriers, the interior channel into a plurality of subchannels.

17. The method of claim 13 in which step (c) comprises:

(c.1) controlling the pressure of the gas streams so that the gas streams flow in directions which are not perpendicular.

18. The method of claim 13 in which step (c) comprises:

(c.1) controlling the pressure of the gas streams so that the gas streams flow in different directions.

19. The method of claim 13 in which step (c) comprises:

(c.1) controlling the pressure of the gas streams so that the gas streams flow in opposite directions.

20. An apparatus for enabling heat and moisture exchange comprising:

an exchanger housing comprising an exterior wall defining an interior channel through which a gas stream may pass, at least a portion of the exterior wall comprising a light transmitting material;

a water vapor permeable barrier disposed within the interior channel and partitioning the interior channel into a plurality of separate subchannels;

a first of the subchannels adapted to receive a first gas stream at the same time a second of the subchannels is adapted to receive a second gas stream, the water vapor permeable barrier allowing simultaneous exchange of heat and moisture between the first gas stream and the second gas stream through the water vapor permeable barrier.

* * * * *